Jan. 1, 1935. A. G. BORDEN 1,986,247
NASAL INHALER
Filed Feb. 2, 1934 2 Sheets-Sheet 1
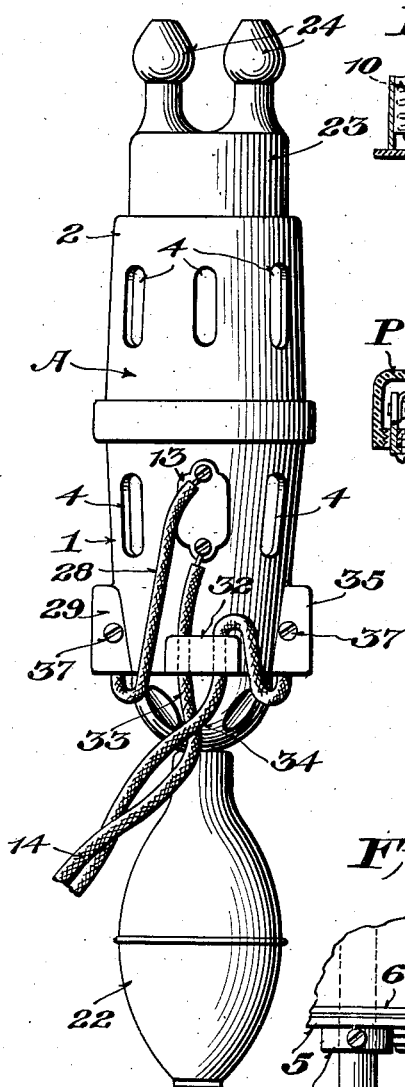
Inventor
Arthur G. Borden, Jan. 1, 1935.  A. G. BORDEN  1,986,247
NASAL INHALER
Filed Feb. 2, 1934  2 Sheets-Sheet 2
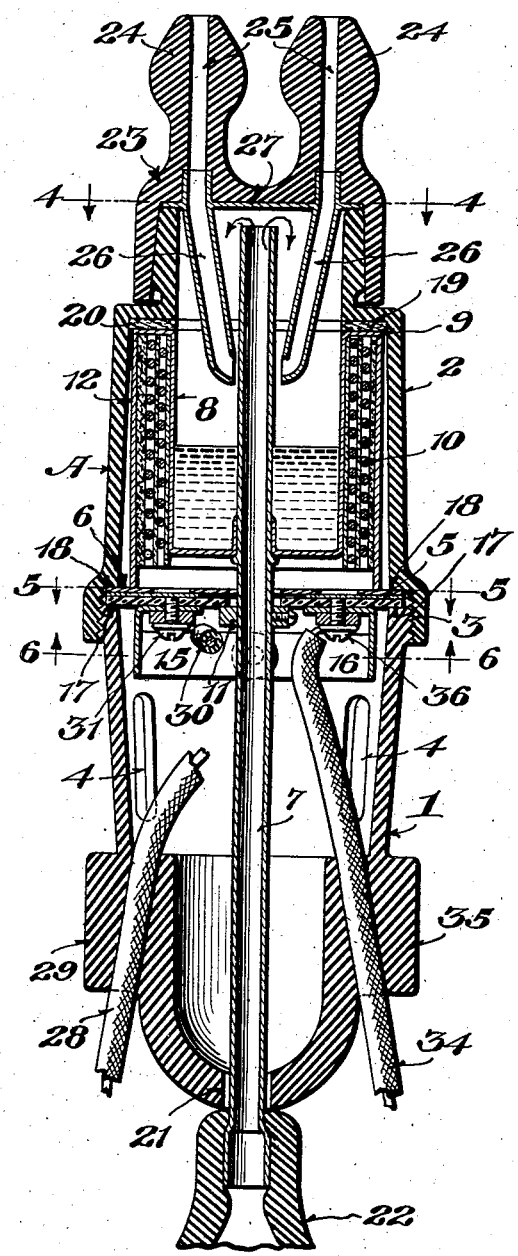
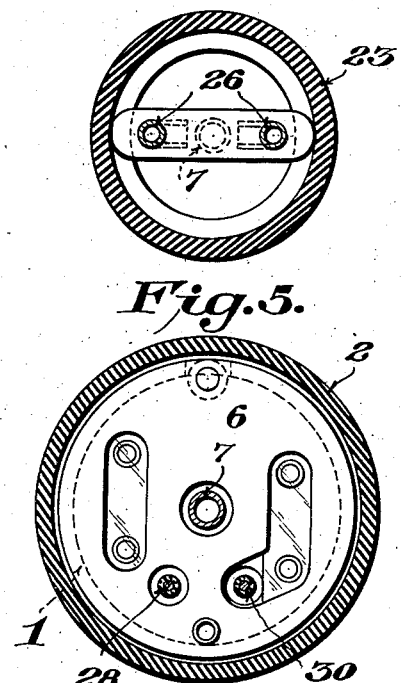
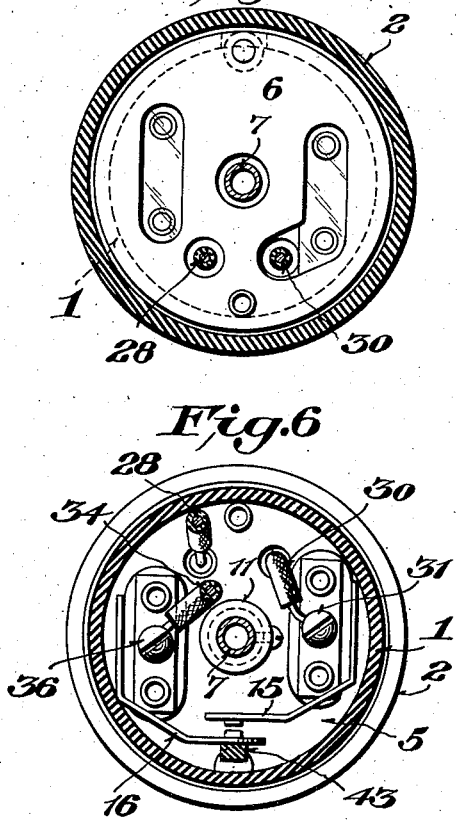
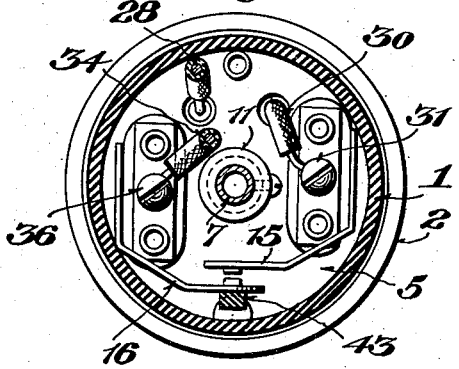
Inventor
Arthur G. Borden,
By
Attorney Patented Jan. 1, 1935

1,986,247

UNITED STATES PATENT OFFICE 1,986,247

NASAL INHALER

Arthur G. Borden, Washington, D. C., assignor to The Electro-Inhaler Co., Inc., Washington, D. C., a corporation of Delaware Application February 2, 1934, Serial No. 709,535

12 Claims. (Cl. 128—192)

This invention relates to nasal inhalers, and has particular reference to an improved nasal inhaler of the general type described and claimed in my prior application, Serial No. 665,965.

One of the objects of the present invention is to provide a nasal inhaler embodying a simplified construction which is especially desirable from an economical production standpoint.

Another object of the present invention is to provide a nasal inhaler embodying improved means for holding a medicament to be vaporized, improved heating means for vaporizing the medicament, and novel means for the control of said heating means.

Another object of the present invention is to provide means whereby, in the event of use of a medicament of a liquid, powdered or other form which is capable of flowing, the inhaler may be held in practically any convenient position for use, or may be placed in practically any desired position when not in use, without danger of the medicament escaping from its holder.

Another object of the present invention is to provide novel means for producing a flow of medicament vapors from the inhaler.

A further object of the invention is to provide a nasal inhaler which is of neat, attractive appearance, which embodies a compact construction and assembly of elements, and which is thoroughly practical and highly efficient for its purpose.

With the foregoing and various other objects and purposes in view, which will become more fully apparent as the nature of the invention is better understood, the same consists in the novel features of construction, combination and arrangement of parts as will be hereinafter more fully described, illustrated in the accompanying drawings and defined in the appended claims.

In the drawings, wherein like characters of reference denote corresponding parts in the different views:—

Figure 1 is a side elevation of the improved inhaler.

Figure 2 is a side elevation of the inhaler at right angles to Fig. 1.

Figure 3 is a central, longitudinal section through the inhaler.

Figures 4, 5 and 6 are cross-sections on the lines 4—4, 5—5 and 6—6, respectively, of Fig. 3.

Figure 7 is a detail sectional view showing particularly the heating element control switch of the inhaler.

Figure 8 is a detail view showing a removable medicament holding cup for use with the inhaler.

Figure 9 is a detail view illustrating how the inhaler may be used with an automatic switch.

Referring in detail to the practical embodiment of the invention illustrated in the drawings, A designates, generally, an elongated casing composed of two sections, designated as 1 and 2, which have a screw-threaded connection therebetween as indicated at 3. The casing sections are molded or otherwise suitably formed from suitable heat insulating material and are apertured as indicated at 4 for the circulation of air through the casing to maintain the same cool.

At 5 is designated a disk of fibre or other electrical insulating and heat resisting material, and at 6 is designated a disk of brass or other suitable metal which is superimposed upon and riveted or otherwise suitably secured to the disk 5 to reinforce and stiffen the same and to act at the same time as a heat reflector and a shield to protect the disk 5 from heat.

Extending through central openings in the disks 5 and 6 is an elongated tube 7 which, outwardly of said disks, has suitably fixed thereto, as by means of solder or in any other suitable manner, a cup designated as 8. This cup 8 is closed at its sides and at its inner end, but at its outer end is open and provided with an outwardly directed flange as indicated at 9. Of greater diameter than the cup 8 and surrounding the same is a sleeve 10 which, at its inner end, rests against the disk 6 and at its outer end against the flange 9. On the tube 7, inwardly of the disk 5, is a collar 11 which, by engagement with the inner face of said disk 5 and by reason of the fact that the cup 8 is fixed to the tube 7, serves to hold the tube, the cup and the sleeve in unitary assembly.

Within the annular space between the cup 8 and the sleeve 10 is arranged a suitable electrical heating element 12 composed, for example, of one or more coils of suitably insulated resistance wire.

On the inner casing section 1 is suitably mounted a thermal switch 13 to one terminal of which is connected one of the current supply wires of an extension cord 14 and to the other terminal of which is connected one of the terminals of the heating element 12.

Carried by the disk 5 at the inner side thereof is a pair of flexible leaf switch arms 15 and 16 which overlap each other in normal spaced relationship and which have connected therewith, respectively, the other terminal of the heating element 12 and the other current supply wire of the extension cord 14. Both the thermal switch 13 and the switch composed of the arms 15 and 16 thus are included in the heating element circuit which is maintained normally open due to the normal spaced relationship of the arms 15, 16 and which is designed to be closed by inward flexure of the switch arm 16 against the switch arm 15.

As illustrated in Fig. 3 of the drawings, the unitary assembly comprising the disks 5 and 6, the tube 7, the cup 8, the heating element 12, and the switch arms 15, 16 carried by the disk 5, is disposed within the casing A with the marginal portions of the disks 5 and 6 interposed between shoulders 17 and 18 on the casing sections 1 and 2, respectively, whereby tightening of the threaded connection 3 between said casing sections serves to clamp the disks 5 and 6 between said shoulders and thus mounts the unitary assembly firmly and securely within the casing. In this connection it will be observed that when the unitary assembly is operatively mounted within the casing A, the switch arms 15, 16 are disposed within the casing section 1, and the cup 8 and the heating element 12 are disposed within the casing section 2 concentrically therewith with the sleeve 10 spaced from the side wall of the casing section 2 to afford a space for the circulation of cooling air within the section 2. Further, it will be observed that the casing section 2 is provided with an internal, inwardly facing annular shoulder 19 near its outer end overlying the cup flange 9, and that interposed between this shoulder and said flange is a suitable gasket 20 which serves to prevent leakage of medicament or medicament vapors from the cup 8 into the casing A.

In the inner end of the casing section 1 is formed a central opening 21, and when the aforementioned unitary assembly is operatively mounted within the casing the inner end portion of the tube 7 extends through said opening so as to have removably engaged therewith a bulb 22 of known construction for finger manipulation to produce a flow of air through said tube 7. On the other hand, when the unitary assembly is operatively mounted within the casing the outer end portion of the tube 7 which extends through the cup 8 and beyond the outer, open end of said cup, terminates a short distance inwardly of the plane of the outer end of the casing section 2, which outer end portion of said casing section is of reduced diameter and, externally, is slightly tapered outwardly as shown.

A cap 23 is provided to fit over the reduced, outer end portion of the casing section 2, and in order that said cap may removably and yet tightly fit said portion of said casing section it is internally tapered corresponding to the external taper of the said casing section.

Projecting outwardly from the cap 23 is a pair of nostril engaging teats 24 through which are formed ducts 25 which open into the interior of the cap and consequently into the outer end portion of the casing section 2 when the cap is applied to said casing section. Thus, assuming the cup 8 to contain a quantity of medicament and the heating element 12 to be in operation vaporizing said medicament, it is apparent that by operation of the bulb 22 a current of air may be produced through the device and that the air current in its passage through the outer end portion of the casing section 2, will cause medicament vapors to be discharged therewith through the ducts 25 into the nostrils.

In order to adapt the device to be handled freely and to be used in various different positions without danger of loss of medicament from the cup 8, the cap 23 is equipped with a pair of tubes 26, 26 which have their outer end portions engaged in the ducts 25, 25, respectively, and which extend inwardly in converging relationship so as to terminate at their inner ends more or less closely adjacent to opposite sides of the tube 7. The said tubes 26 are of lengths to extend suitable distances into the casing section 2 and at their inner ends are formed to open laterally inwardly toward the tube 7. Consequently, they form traps preventing flow of medicament from the cup 8 and the outer casing section 2 through the ducts 25 regardless of the position in which the device may be disposed without, however, offering obstructions to the free flow of air and medicament vapors through the device. Moreover, said tubes 26 require air issuing from the outer end of the tube 7 to flow inwardly before it may pass outwardly through said tubes 26 and the ducts 25, thus assuring an efficient intermixture of medicament vapors with the air.

Preferably, but not necessarily, the tubes 26, 26 are joined together by a plate 27 whereby the tubes are reinforced and are maintained properly positioned with respect to each other to be removed from and applied to the cap 23 as a single unit. In this connection, while the fit of the outer end portions of the tubes within the ducts 25 is sufficiently tight to maintain the tubes normally assembled with the cap, the plate 27 nevertheless is positioned to lie against the inner face of the outer closed end of the cap, and the ends of said plate are disposed to be received between the outer end of the casing section 2 and the closed end of the cap 23 whereby, when the cap is applied to said casing section, the tubes 26 are positively held in operative position.

Reverting to the electrical connections of the device, it is pointed out that the connection between one terminal of the heating element 12 and one terminal of the thermo switch 13 comprises a wire 28 which extends from the heating element 12 through alined openings in the disks 5 and 6, thence through the casing section 1 and through an opening in an enlargement 29 of said casing section to the exterior of the casing where it is connected with the thermo switch 13. From the other end of the heating element 12 a wire 30 extends through the disks 5 and 6 and is connected to the switch arm 15 as indicated at 31. A lug 32 is formed on the inner casing section 1 and the wires 33 and 34 of the extension cord 14 extend through openings in this lug and are respectively connected to the second terminal of the thermo switch 13 and to the second switch arm 16, the wire 34, after being passed through the lug 32, being extended through an opening in a second enlargement 35 of the casing section 1 and then connected to the switch arm 16 as indicated at 36. Set screws 37 are threaded in the enlargements 29, 35 against the wires 28, 34. Thus, any strain on the internal electrical connections due to handling of the device are effectively avoided.

In order to provide for the convenient manual control of the heating element 12 by the person holding the device, a button 38 is provided and located for actuation by pressure of the hand of the person holding the device to close the switch 15, 16. As shown in Fig. 7, an opening 39 is formed in the side wall of the casing section 1 in alinement with the free end portion of the switch arm 16 and through said opening is extended the shank 40 of the button 38, the button having a flange 41 engaging the outer face of the casing section and the shank 40 having a pin 42 passed therethrough and engaging the inner face of the casing section whereby the button is mounted for inward and outward movement. An extension 43 of the button overlies the switch arm 16 and due to the constant tendency of said switch arm to spring outwardly under the influence of its inherent resiliency the button 38 normally is maintained at its limit of outward movement. Consequently, simply by inward pressure against the button 38 the switch arm 16 may be swung inward into engagement with the switch arm 15 to close the heating element circuit, and upon release of pressure from the button the switch arm 16 is free to swing outwardly away from the switch arm 15 to open the circuit. Thus, the heating element 12 may readily be controlled at the will of the person holding the device.

In the use of the device the cap 23 is removed and a suitable quantity of medicament in any form, as a powder, liquid or salve for example, is placed within the cup 8. The cap 23 then is applied and the heating element circuit closed to vaporize the medicament, whereupon the teats 24 are inserted in the nostrils and the bulb 22 manipulated to produce a current of air through the device to carry the medicament vapors into the nasal passages.

In many instances it may be desired to use different medicaments at different times in the device. Therefore, the device as supplied to the trade includes a plurality of cups 8a all of which may be of the same size and construction. Each cup 8a comprises a cup body of a size to fit into the reduced outer end portion of the casing section 2 and to extend a suitable distance into the cup 8, there being an outwardly directed flange 9a at the outer end of each cup 8a to rest against the outer end of the casing section 2 and to be confined between the end of said casing section and the cap 23 to hold the cup properly positioned within the device. In addition, each cup 8a is provided with a central tube 44 to neatly receive the tube 7 whereby leakage of medicament or medicament vapors from any cup 8a along the tube 7 into the casing A is prevented. Of course, it is optional with the user of the device whether to employ the cup 8 or one of the cups 8a to hold the medicament, the operation of the device being the same in either case.

Figure 9 of the drawings illustrates the modification of the invention wherein the heating element circuit is automatically and intermittently controlled. That is to say, according to this embodiment of the invention the extension cord 14a may be directly connected to the terminals of the heating element 12, dispensing with the thermal switch 13, and providing the cord 14a with an attachment plug P having housed therein an automatic thermal switch device of the type shown in Patents Nos. 1,400,914, December 20, 1921; 1,602,088, October 5, 1926; and 1,683,992, September 11, 1928. This device is designated generally as R and is located in the body of the attachment plug between the ends of the wires in the cord 14a and the pin type connectors P' of the plug. In its commercial form the automatic switch R is in the form of a button or disk of insulation having contacts at opposite sides thereof and an intermediate thermally actuated switch element which becomes heated upon the passage of current to complete the circuit through the device and through the line, and then automatically cuts out at a predetermined interval so as to permit the thermal switch element to cool off and again close the circuit. The intermittent action of the thermal switch device R may have any selected time interval to intermittently supply current from the line to the heating element 12. In this type of apparatus the same is rendered automatically operative by merely plugging in to any available outlet. In a short time the device R in the plug P will permit current to pass for the purpose of supplying current to the heating element 12 and current will be intermittently supplied to the heating element of the inhaler until the plug is removed from the outlet.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. A nasal inhaler device comprising a casing open at its outer end, a medicament holding cup in open communication with the outer end of said casing, a removable cap closing the open end of said casing and provided with a medicament vapor outlet duct, means disposed in surrounding relationship to said cup for heating the same and effecting vaporization of a medicament contained therein, and a tube extending from said duct into the cup to prevent escape of medicament through the duct in said cap in any position of the device and providing for free flow of medicament vapors at all times through said duct.

2. A nasal inhaler comprising a casing composed of inner and outer separably connected sections, means closing the outer end of the outer section and provided with a duct for the escape of medicament vapors, a member clamped between said sections, and a unitary structure carried by said member and comprising a medicament holding cup opening into the outer end portion of the outer casing section, electrical heating means for said cup included in said unitary structure in surrounding relationship to said cup, and a tube also included in said unitary structure and extending at least partly through the cup and opening at its outer end into the outer end portion of the outer casing section and at its inner end extending through the inner end of the inner casing section for the attachment thereto of means to produce a flow of air therethrough.

3. A nasal inhaler comprising a casing composed of inner and outer separably connected sections, a disk clamped between said sections, a tube extending through said disk and to the exterior of the inner section, means connected with the inner end of said tube for producing a flow of air therethrough, a cup carried by said tube at the outer side of said disk and disposed within the outer casing section, a flange at the outer end of said cup, a sleeve surrounding said cup and interposed between said flange and said disk, means on the tube engaging the inner side of the disk to hold the tube, the cup and said sleeve in unitary assembly, a heating element between the cup and said sleeve, the cup being in open communication at its outer end with the outer end portion of the outer casing section, a cap closing the outer end of the outer casing section and provided with an outlet duct, the outer casing section having a shoulder overlying the flange of the cup.

4. A nasal inhaler as set forth in claim 3 including a heating element controlling switch carried by the disk and disposed within the inner casing section, a switch actuator, and means whereby the disk and the unitary assembly carried thereby may be removed from the casing without disturbing said switch actuator.

5. A nasal inhaler comprising a casing having an outer open end, a medicament containing cup within said casing in open communication at its outer end with the outer end portion of said casing, a removable cap closing the outer end of said casing and provided with a medicament vapor outlet duct, means surrounding said cup for heating the same to effect vaporization of a medicament contained therein, and a tube communicating with said duct and extending from said cap inwardly into the cup to prevent escape of medicament and permit escape of medicament vapors through said duct.

6. A nasal inhaler comprising a casing having an outer open end, a medicament containing cup within said casing in open communication at its outer end with the outer end portion of said casing, a removable cap closing the outer end of said casing and provided with a pair of outlet ducts, an air supply tube extending through the cup and opening into the outer end portion of the casing, and a pair of tubes connected with said ducts, respectively, said tubes extending inwardly from the cap and having their inner ends opening laterally inwardly towards said tube.

7. A nasal inhaler as set forth in claim 6 in which a plate connects said tubes and in which portions of said plate are disposed for interposition between the outer end of the casing and the cap.

8. A nasal inhaler comprising a casing composed of inner and outer separably connected sections, a disk confined between said sections, a medicament containing cup and a surrounding electrical heating element rigidly mounted on said disk, at one side thereof switch means for said heating element mounted on the other side of said disk, and means for the escape of medicament vapors from the outer casing section.

9. A nasal inhaler comprising a casing open at its outer end, an air supply tube axial of said casing and opening at its outer end into the outer end portion of the casing, hollow heating means within the casing, a medicament containing cup for insertion into the outer end portion of said casing and into said heating means, said cup having a central tubular formation to receive said air supply tube and further having a flange at its outer end to rest against the outer end of the casing, and a closure cap fitted over the outer end of the casing and provided with medicament vapor outlet means, said cap bearing against the flange of said cup whereby a cup is held properly positioned within the casing.

10. A nasal inhaler comprising a casing composed of inner and outer separably connected sections, medicament vapor outlet means at the outer end of the outer section, a disk confined in the casing and dividing the casing into inner and outer chambers, a hollow electrical heating element disposed within the outer chamber, a medicament holder disposed within the outer chamber and within said heating element, an air inlet tube extending from the inner end of the inner section through the inner chamber and through said disk into said holder, and switch means carried below said disk and disposed within the inner chamber for controlling said heating element.

11. A nasal inhaler comprising a casing composed of inner and outer sections, means connecting said sections whereby they are drawn together when relatively rotated, medicament vapor outlet means at the outer end of the outer section, said outer section having an inwardly directed inwardly facing shoulder, a disk clamped between the casing sections, a sleeve within the outer casing section bearing at its inner end against said disk, a hollow electrical heating element within said sleeve, and a medicament holding cup within said heating element, said cup having an outwardly directed flange at its outer end overlying the outer end portion of said sleeve and bearing against said shoulder.

12. A nasal inhaler comprising a casing composed of inner and outer separably connected sections, medicament vapor outlet means at the outer end of the outer section, a disk confined between the sections and dividing the casing into inner and outer chambers, a hollow electrical heating element and a contained medicament holder both carried by said disk and disposed within the outer chamber, an air inlet tube extending from the inner end of the inner casing section through the inner chamber and through said disk into said holder, and switch means disposed within the inner chamber for controlling said heating element.

ARTHUR G. BORDEN.